Figure 1:
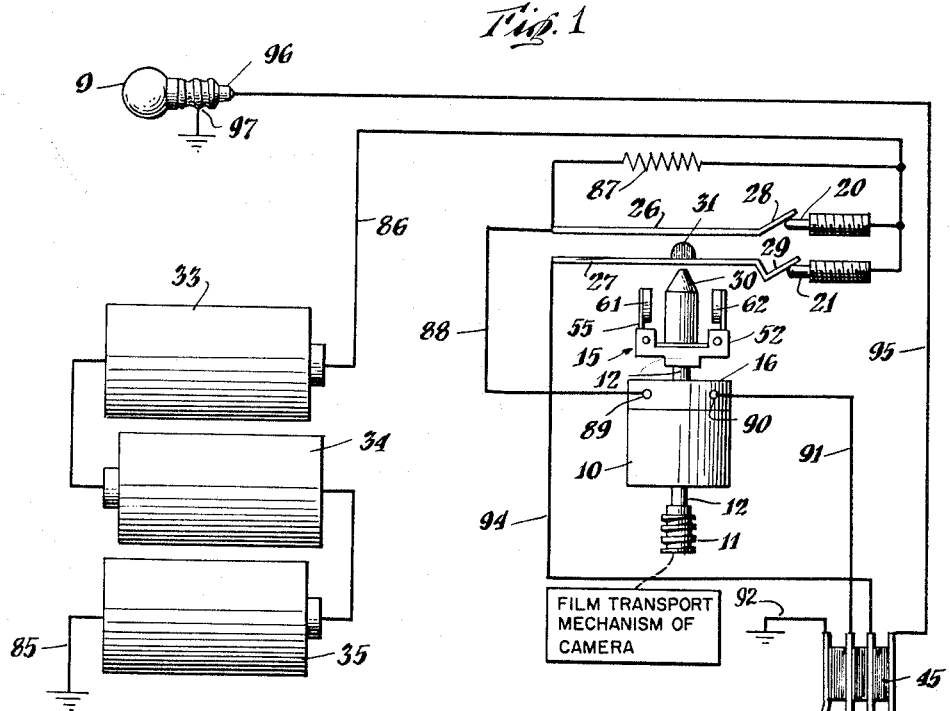

March 9, 1965  F. A. BLANK  3,173,072
D.C. MOTOR SPEED CONTROL AND SIGNALLING SYSTEM, PARTICULARLY
DESIGNED FOR MOTION PICTURE CAMERAS
Original Filed Dec. 14, 1956

United States Patent Office 3,173,072
Patented Mar. 9, 1965

3,173,072
D.C. MOTOR SPEED CONTROL AND SIGNALLING SYSTEM, PARTICULARLY DESIGNED FOR MOTION PICTURE CAMERAS
Fritz A. Blank, New Rochelle, N.Y., assignor, by direct and mesne assignments, of one-half to A. Kip Livingston, West Hempstead, N.Y., and one-half to Longines-Wittnauer Watch Co., Inc., New York, N.Y., a corporation of New York
Original application Dec. 14, 1956, Ser. No. 628,283, now Patent No. 2,971,432, dated Feb. 14, 1961. Divided and this application Dec. 19, 1960, Ser. No. 76,783
4 Claims. (Cl. 318—325)

This invention relates to direct current motor speed controlling means and motor speed signalling systems and, more particularly, to an improvement in electric battery powered motion picture cameras, such as apparatus combining camera motor speed regulation with a visual signal indication whenever the operating speed of the camera mechanism falls below a predetermined critical speed, due to depletion of the operating battery or for any other reason.

The invention may be adapted to any motion picture camera in which the mechanism is driven by an electric motor deriving its motivating power from a battery source. One example of such a camera, having a self-contained battery source, is disclosed in the co-pending application of John W. Oxberry, Serial No. 405,543 filed January 22, 1954, now Patent 2,912,898, issued November 17, 1959.

In the art of taking motion pictures it is necessary that the speed of operation of the camera shutter and film transport mechanism be well regulated, within tolerable limits, in order that the pictures when projected will be free from flicker, and in order that the apparent motion of the projected images will be smooth and not jerky. In battery operated motion picture cameras it is not only necessary to maintain the speed of a direct current motor substantially constant—within a narrow range of limited speed variations, which range is the optimum speed for normal operation, but it also becomes necessary to provide warning means to signal the camera operator whenever the potential of the operating battery source is decreased to a point at which the battery source becomes inadequate to maintain the required speed of motor operation. Such a decrease in battery potential may result from battery depletion through prolonged use, from normal "shelf" deterioration, from excessive temperature changes, or through other causes beyond the knowledge or control of the operator. If the depleted batteries are not removed and replaced when this condition arises, the camera may continue to operate but at a speed below the desired optimum speed, with a resultant deterioration in the quality of motion pictures which may be projected from the exposed and developed film.

Although the camera batteries in normal operation may continue to supply the requisite energy for several hundred hours, batteries do have a limited "shelf life" and the occasional and sometimes infrequent use of cameras in the taking of "home movies" affords the operator no reliable guide as to when fresh batteries should be installed.

One of the objects of the present invention is to provide visual signal means for informing an operator of battery powered motor-driven equipment when new batteries should be installed in the supply circuit of the motor, such as for example the operator of a battery powered motion picture camera.

Another object is to provide such a signal which is visible within the camera view finder, whereby an operator may be immediately informed of any decrease in camera motor speed while the camera is in use.

A further object is to provide visual signal means within the view finder which will give a signal of one character to warn of an aproaching decrease in motor speed before a critical minimum speed is reached, and which will give a signal of different characteristic when the motor is reduced below the critical minimum speed.

Another object is to provide visual signal means within an electrically operated camera visually to indicate by a first characteristic when the camera is operating properly, and to indicate by a different characteristic when the camera is operating at an improper speed.

A more general object is to provide improved direct current motor speed regulation with visual indication of speed changes within predetermined limits, suitable for use in various D.C. motor-driven equipment, such as a battery operated motion picture camera.

A more specific object is to combine motor speed control means with electrical signal control means in a battery operated motion picture camera to produce a visual signal, in the camera view finder, whenever the motor speed drops below a predetermined critical speed.

Other objects of the invention will in part be obvious and will in part appear hereinafter.

The invention accordingly comprises the combinations of elements, and arrangement of parts, which will be exemplified in the constructions hereinafter set forth, and the scope of the invention will be indicated in the claims.

Figure 2:
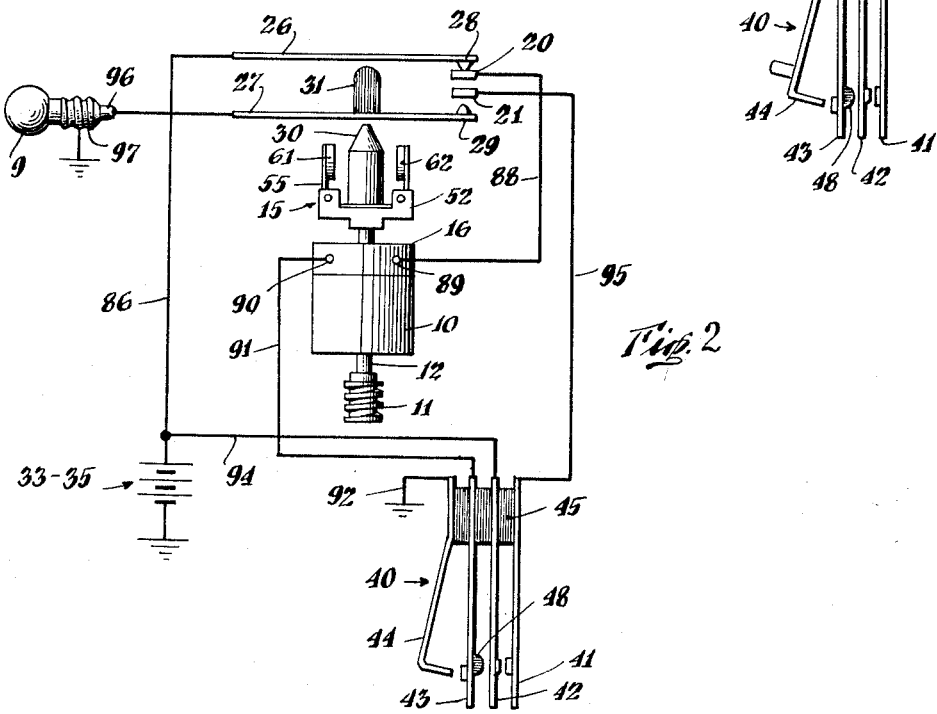

For a fuller understanding of the nature and objects of the invention reference should be had to the following detailed description taken in connection with the accompanying drawings, in which:

FIG. 1 is a schematic diagram of speed and signal controlling means and circuit thereof according to one embodiment of the invention; and FIG. 2 is a schematic diagram of an alternative form of signal control and circuit thereof according to the invention.

Prior to the present invention there was no satisfactory way for the operators of battery powered "home movie" cameras to determine when they should replace the camera operating battery. Because the electric motors of these cameras operate so smoothly and quietly, and for such a long period of time before the batteries become depleted, it required an extremely acute sense of hearing to detect a slight reduction in camera operating speed such as might cause a deterioration in the quality of motion pictures filmed. Very often the need to replace batteries might not be detected until after a complete roll of film had been exposed, developed and projected. To eliminate this possibility of unknowingly exposing a roll of film at an improper speed, due to depletion of the camera battery, I have devised the motor speed control and visual signal means of the present invention to assure the operator that and when his camera is functioning at the proper speed, and to warn him instantly when the camera motor speed starts to decrease below a permissible limit.

Referring now in greater detail to the drawings, a visual signal indicating element 9 is introduced into the view finder enclosure. In the preferred embodiment of the invention the visual signal indicating element comprises an electric lamp 9, although it is to be understood that other forms of visual indicators may be employed within the scope of the invention.

Referring to FIG. 1, an electric motor 10 drives the camera shutter and film transport mechanism (not shown) through worm gear 11 mounted on the lower end of motor shaft 12. On the opposite or top end of motor shaft 12 is mounted a fly-ball speed control governor indicated generally at 15, the detailed structure of which will be described more fully hereinafter.

Mounted on the end casing of motor 10 is a generally

U-shaped bracket (not shown) which carries on one leg thereof an insulating member (also not shown), to the upper end of which is mounted an adjustable electrical contact member 20. A second electrical contact member 21 is mounted adjacent to but below contact 20, also being supported by the insulating member. The insulated mounting (not shown) supports a pair of substantially parallel spring contact members 26 and 27 which, as indicated, are insulated from each other. The opposite ends of spring members 26 and 27 carry movable electrical contacts 28 and 29 which when the electric motor 10 is idle are normally in conductive engagement with the abutting electrical contacts 20 and 21. Slidably mounted on the upper end of motor shaft 12 in a position to be operable by fly-ball governor 15 is a plunger 30 of insulating material adapted to engage and operate upon spring contact member 27 when motor 10 is in operation. Between the spring members 26 and 27 is positioned an insulating pin 31 adapted to engage and operate upon spring 26 after spring 27 is flexed by operation of plunger 30.

A 4-element leaf spring electrical switch, indicated generally at 40, is provided comprising four contact members 41, 42, 43 and 44. Switch springs 41, 42 and 43 are insulated from each other and from the motor casing 10 by laminations of insulating material 45. An external switch button (not shown) is slidably mounted on the camera casing in a position to engage behind the lower extremity of switch spring member 44. In FIG. 1, which is a schematic diagram of a preferred embodiment, it will be seen that a plurality of primary cells, here represented as three flashlight type batteries 33, 34 and 35, are connected in series to form a battery source for operating motor 10 and signal lamp 9. The negative side of this battery source 33–35 is connected to a ground bus within the camera through a line 85, while the positive side of the battery source 33–35 is connected through a line 86 to adjustable contact members 20 and 21.

The circuit between contact member 20 and movable spring member 28 is bridged by a fixed resistor 87 which preferably is of a low resistance value. Resistor 87, for example, may be of the order of 40 ohms. The function of resistor 87 is to suppress sparking between fixed contact 20 and movable contact 28 as the energizing circuit of motor 10 is alternately opened and closed during normal operation. Resistor 87 may not be necessary if certain types of motors are employed, as for example a motor adapted to operate on a very low battery voltage.

Flexible spring member 26, as shown in FIG. 1, is connected by a line 88 to one terminal 89 of motor 10 while another terminal 90 of motor 10 is connected by a line 91 to spring leaf 43 of manually operated switch 40. Spring leaf 44 of manual switch 40 is grounded as shown at 92. When switch spring 44 is moved from left to right as viewed in FIG. 1, switch spring 44 conductively engages spring 43 to close the described motor supply circuit and start operation of motor 10. Further motion of switch spring 44 in the same direction brings insulated pin 48 into engagement with spring 42 whereby force is applied to flex switch spring 42 into conductive engagement with spring 41 to complete a signal circuit which may be traced from the positive side of battery source 33–35 through line 86, thence through fixed contact 21, movable contact 29, flexible spring 27, line 94 connecting signal control spring 27 with manual switch spring 42, thence through switch spring 41, and finally connecting line 95 to one terminal 96 of signal lamp 9, the other terminal 97 of which is grounded. Completion of the circuit just described by complete closure of switch 40 energizes lamp 9. However, as the motor circuit has also been energized by the operation of switch 40, motor 10 is started and governor 15 now raises insulated plunger 30 to flex signal control spring 27 upwardly thus disengaging movable contact 29 from fixed contact 21 to open the signal circuit and extinguish lamp 9.

Continued operation of motor 10 will normally result in further elevation of the insulated plunger 30 until insulated pin 31 on spring 27 engages flexible motor control spring 26 to momentarily raise movable contact 28 from conductive engagement with fixed contact 20, whereby resistor 87 is placed in series with the motor energizing circuit between lines 86 and 88, thereby retarding any further increase in motor speed. In some embodiments it may be desired to employ a variable or adjustable resistor at 87 whereby the current flow through motor 10 when the supply circuit is open at contacts 20 and 28 may be set at a value to maintain the desired speed of motor 10. Any slight decrease in motor speed causes the centrifugal governor 15 to permit insulated plunger 30 to retract sufficiently to re-establish contact between movable contact member 28 and fixed contact 20, thereby short-circuiting resistor 87 and re-applying full potential from battery source 33–35 to motor 10.

The position of fixed contact 20 may be adjusted to provide for normal "hunting" operation of motor 10 between very close upper and lower limits of speed by the alternate opening of contacts 20 and 28 at the upper limit of tolerance and closing of these contacts at the lower tolerable limit of speed. As the centrifugal governor 15 may exercise a considerable measure of control over speed changes of motor 10, the combined effect of centrifugal governor 15 and the electrical speed governing action of FIG. 1 provides an execeptionally well regulated speed control for motor 10.

Still referring to FIG. 1, the operation of the signal control portion of this circuit will now be described in greater detail. When the potential of battery source 33–35 drops toward the minimum potential required to maintain the operation of motor 10 within the optimum speed range, the initial retardation of motor speed causes the fly weights 61 and 62 of centrifugal governor 15 to move inwardly toward their axis of rotation about motor shaft 12, thereby lowering insulated plunger 30 until movable contact 29 of signal control spring 27 engages fixed contact 21 to complete the signaling circuit described above and energize signal lamp 9. In normal operation, due to the slight hunting action of centrifugal governor 15 in seeking to maintain constant the speed of motor 10, the initial contact between signal control members 21 and 29 will be intermittent, as insulated plunger 30 rises and falls slightly through the hunting action of governor 15 at this speed. This intermittent closure of movable contact 28 with fixed contact 21 produces a flashing indication in lamp 9 to warn the operator that motor speed has been reduced to a lower tolerable limit. As the speed of motor 10 is reduced further, with further drop in potential of battery source 33–35, movable member 29 remains in continuous engagement with fixed contact 21 to produce a constant indication in signal lamp 9 whereby the operator is informed that motor speed has now dropped below the critical minimum necessary to assure motion pictures of the desired quality.

Reference is now made to FIG. 2 of the drawings which represents an alternative schematic circuit diagram whereby a signal indication of different characteristic may be obtained within the scope of the invention. The elements of the circuit in FIG. 2 correspond substantially to the same elements shown in FIG. 1, the most significant difference being in the connections to the signal control means. As shown in FIG. 2, the signal control switch spring 27 in its idle condition is dis-engaged from fixed signal contact 21. In the operation of the circuit of FIG. 2 it may be seen that when the springs of the manually operated starting switch 40 are all flexed into positions of engagement, the motor energizing circuit is completed in exactly the same manner as was described above in reference to FIG. 1. The rotation of centrifugal governor 15 through normal operation of motor 10 elevates insulated plunger 30 to engage flexible spring 27 whereby movable contact 29 is brought into conductive engagement with fixed contact 21 to complete the circuit through a line 95, manual switch springs 41 and 42, and a line 94 whereby electrical energy from battery source 33–35 is applied to signal lamp 9. In the normal operation of the circuit of FIG. 8 this signaling circuit remains closed so long as motor 10 is operating above a critical minimum speed, thereby producing a continuous indication in signal lamp 9. As the speed of motor 10 increases to the upper limit of its optimum range insulated pin 31 operates on flexible spring 26 to open movable contact 28 from conductive engagement with fixed contact 20 whereby the motor energizing circuit is opened, but the signal energizing circuit remains closed through contacts 21 and 29.

Thus it will be seen that in the circuit of FIG. 2 signal indicating lamp 9 remains energized until the speed of motor 10 decreases to the minimum tolerable speed at which the contact between members 21 and 29 is intermittently broken to produce a flashing signal indication by lamp 9. Further reduction of the speed of motor 10 in the circuit of FIG. 2 produces a continuous open circuit between contacts 21 and 29 thereby extinguishing lamp 9.

It will thus be seen that the objects set forth above, among those made apparent from the preceding description, are efficiently attained and, since certain changes may be made in the above construction without departing from the scope of the invention, as for example the invention may be employed in direct current motor speed control and signaling systems other than embodiment in a motion picture camera, it is intended that all matter contained in the above description or shown in the accompanying drawings shall be interpreted as illustrative and not in a limiting sense.

This application is a division of my co-pending application Serial 628,283, filed December 14, 1956, for "D.C. Motor Speed Control and Signalling System, Particularly Designed for Motion Picture Cameras," which resulted in Patent 2,971,432, issued February 14, 1961.

I claim:

1. In a motion picture camera the combination with film transport mechanism, a source of direct current power, the voltage of which can drop below a predetermined critical value, a direct current motor which slows up in drop of voltage of its power supply and is connected to said film transport mechanism, and a supply circuit electrically to connect said power source to said motor for energizing the latter, of a speed controlled mechanism operable by said motor, switch means operable by said speed controlled mechanism and connected in said supply circuit temporarily to de-energize said motor at a predetermined critical maximum speed and permit energization thereof at speeds below the critical maximum, electrical visual signal means visually to indicate motor speeds below a predetermined lower limit, a signal circuit for energizing said signal means from said power source, and switch means in said signal circuit operable by said speed controlled mechanism at the predetermined lower limit of motor speed for causing the signal means to indicate motor speeds at and below the lower limit of the motor speed.

2. In a motion picture camera the combination with film transport mechanism, a battery source of direct current power the voltage of which gradually drops with depletion, a direct current motor which slows up with drop of voltage of its power supply and is connected to drive said film transport mechanism, and a supply circuit electrically to connect said power source to said motor for energizing the latter, of a speed controlled governor operable by said motor, normally-closed switch means operable by said governor and connected in said motor supply circuit to maintain closure of said circuit for energization of said motor at speeds below a predetermined critical maximum and temporarily to break said circuit at the critical maximum, an electrical visual signal visually to indicate motor speeds below a predetermined lower limit, a signal circuit electrically to connect said power source to said visual signal, and switch means in said signal circuit operable by said governor at the predetermined lower limit of motor speed for causing said signal to indicate motor speeds at and below the lower limit of the motor speed.

3. An electric motor control and signal system comprising a battery source of direct current power the voltage of which gradually drops with depletion, a direct current motor rotatable at lower rates of speed with drop in voltage of the source of power, a supply circuit electrically to connect said power source to said motor for energizing the latter, a speed controlled governor operable by said motor, normally-closed switch means operable by said governor and connected in said motor supply circuit to maintain closure of said circuit for energization of said motor at speeds below a predetermined critical maximum and temporarily to break said circuit at the critical maximum, an electrical visual signal visually to indicate motor speeds below a predetermined lower limit, a signal circuit electrically to connect said power source to said visual signal, and switch means in said signal circuit operable by said governor at the predetermined lower limit of motor speed for causing said signal to indicate motor speeds at and below the lower limit of the motor speed.

4. An electric motor control and signal system comprising a battery source of direct current power the voltage of which gradually drops with depletion, a direct current motor rotatable at lower rates of speed with drop in voltage of the source of power, a supply circuit electrically to connect said power source to said motor for energizing the latter, a speed controlled governor operable by said motor, normally-closed first switch means operable by said governor and connected in said motor supply circuit to maintain closure of said circuit for energization of said motor at speeds below a predetermined critical maximum and temporarily to break said circuit at the critical maximum, an electrical visual signal visually to indicate motor speeds below a predetermined lower limit, a signal circuit electrically to connect said power source to said visual signal, and a second switch means in said signal circuit operable by said governor at the predetermined lower limit of motor speed for causing said signal to indicate motor speeds at and below the lower limit of the motor speed, said first and second switch means each comprising a pair of cooperating stationary and movable contacts, the movable contacts being mechanically interconnected so that the actuation of one of said contacts by the speed controlled governor effects the actuation of the other movable contact.

References Cited in the file of this patent

UNITED STATES PATENTS

| 1,791,149 | Sibley | Feb. 3, 1931 |
| 1,843,922 | Gay | Feb. 9, 1932 |
| 2,079,539 | White et al. | May 4, 1937 |
| 2,278,573 | Spear | Apr. 7, 1942 |
| 2,850,653 | Naul | Sept. 2, 1958 |
| 3,006,239 | Smolar | Oct. 31, 1961 |
| 3,038,110 | Paist | June 5, 1962 |
| 3,084,319 | Hooljkamp | Apr. 2, 1963 |